US010753020B2

(12) United States Patent
Barea

(10) Patent No.: US 10,753,020 B2
(45) Date of Patent: Aug. 25, 2020

(54) METHOD FOR DETECTING AND REMOTELY MANAGING SENSORS AND/OR DEVICES FOR FEEDING TEXTILE AND/OR METALLIC YARNS INSTALLED ON ONE OR MORE TEXTILE MACHINES, AND SYSTEM THEREOF

(71) Applicant: BTSR INTERNATIONAL S.p.A., Olgiate Olona, Varese (IT)

(72) Inventor: Tiziano Barea, Varese (IT)

(73) Assignee: BTSR INTERNATIONAL S.P.A., Olgiate Olona, Varese (IT)

( * ) Notice: Subject to any disclaimer, the term of this patent is extended or adjusted under 35 U.S.C. 154(b) by 247 days.

(21) Appl. No.: 16/067,024

(22) PCT Filed: Dec. 22, 2016

(86) PCT No.: PCT/IB2016/057933
§ 371 (c)(1),
(2) Date: Jun. 28, 2018

(87) PCT Pub. No.: WO2017/115242
PCT Pub. Date: Jul. 6, 2017

(65) Prior Publication Data
US 2019/0003089 A1 Jan. 3, 2019

(30) Foreign Application Priority Data
Dec. 30, 2015 (IT) ........................ 102015000089217

(51) Int. Cl.
*D04B 15/99* (2006.01)
*D04B 15/48* (2006.01)
(Continued)

(52) U.S. Cl.
CPC ............. *D04B 15/99* (2013.01); *D01H 13/00* (2013.01); *D03D 51/18* (2013.01); *D03J 1/006* (2013.01);
(Continued)

(58) Field of Classification Search
CPC ........ D04B 15/48; D04B 15/99; D04B 27/10; D03J 1/006
(Continued)

(56) References Cited

U.S. PATENT DOCUMENTS

2002/0103565 A1* 8/2002 Hosel ..................... D01H 13/32
700/130
2004/0133297 A1* 7/2004 Vergote ................... D06H 3/08
700/140
(Continued)

FOREIGN PATENT DOCUMENTS

DE 10 2006 025 747 A1 12/2007
EP 0 752 631 A1 1/1997
(Continued)

OTHER PUBLICATIONS

International Search Report and Written Opinion of the International Searching Authority for International Patent Application No. PCT/IB2016/057933 dated Apr. 18, 2017, 11 pages.

*Primary Examiner* — Nathan E Durham
(74) *Attorney, Agent, or Firm* — Merchant & Gould P.C.

(57) ABSTRACT

A method and system detect and remotely manage sensors and/or devices for feeding textile and/or metallic yarns on textile machines. Each textile machine includes an electronic control unit electrically connected to the sensors and/or feeding devices for receiving identifiers associated with a sensor and/or feeding device, and data and operating parameters representing a sensor and/or feeding device operating state. A first communication system is associated (Continued)

with the electronic control unit. Wireless communication between the electronic control unit and a portable electronic device is by a second wireless communication system with a display interface. The electronic control unit transmits the identifiers to the portable electronic device. The portable electronic device processes the identifiers to generate menus with selectable entries associated with the textile machines. Each menu represents the number/type of sensors and/or feeding devices installed. The main menu is displayed with selectable entries on the portable electronic device display interface.

17 Claims, 5 Drawing Sheets

(51) Int. Cl.
*G05B 19/418* (2006.01)
*H04W 4/38* (2018.01)
*D01H 13/00* (2006.01)
*H04W 4/50* (2018.01)
*D03J 1/00* (2006.01)
*D03D 51/18* (2006.01)
*D04B 27/10* (2006.01)

(52) U.S. Cl.
CPC ............ *D04B 15/48* (2013.01); *D04B 27/10* (2013.01); *G05B 19/4183* (2013.01); *G05B 19/4185* (2013.01); *H04W 4/38* (2018.02); *H04W 4/50* (2018.02); *B65H 2701/31* (2013.01); *D10B 2101/20* (2013.01); *G05B 2219/36159* (2013.01); *G05B 2219/45193* (2013.01); *Y02P 90/18* (2015.11); *Y02P 90/185* (2015.11)

(58) Field of Classification Search
USPC .......................................... 700/130, 136–144
See application file for complete search history.

(56) References Cited

U.S. PATENT DOCUMENTS

| | | | |
|---|---|---|---|
| 2005/0060058 A1* | 3/2005 | Cameron | ............... D05B 19/08 700/138 |
| 2006/0064196 A1* | 3/2006 | Inkpen | ............... G05B 23/0235 700/142 |
| 2015/0045939 A1* | 2/2015 | Kongo | ................... D05B 19/12 700/143 |
| 2015/0301521 A1 | 10/2015 | Byron et al. | |

FOREIGN PATENT DOCUMENTS

| | | |
|---|---|---|
| EP | 1 953 648 A1 | 8/2008 |
| WO | 2007/035219 A1 | 3/2007 |
| WO | 2013/167380 A2 | 11/2013 |
| WO | 2015/114685 A1 | 8/2015 |

\* cited by examiner 60,60a,60b 60,60a,60b

METHOD FOR DETECTING AND REMOTELY MANAGING SENSORS AND/OR DEVICES FOR FEEDING TEXTILE AND/OR METALLIC YARNS INSTALLED ON ONE OR MORE TEXTILE MACHINES, AND SYSTEM THEREOF

This application is a National Stage Application of PCT/IB2016/057933, filed 22 Dec. 2016, which claims benefit of Ser. No. 102015000089217, filed 30 Dec. 2015 in Italy, and which applications are incorporated herein by reference. To the extent appropriate, a claim of priority is made to each of the above-disclosed applications.

TECHNOLOGICAL BACKGROUND OF THE INVENTION

Field of Application

The present invention relates to a method and system for detecting and remotely managing sensors and/or devices for feeding textile and/or metallic yarns installed on one or more textile machines in a factory.

Prior Art

Technological progress in the textile machine industry has allowed to achieve very high levels of electronic management of the machines and of the operating parameters of sensors and/or devices for feeding textile yarns installed on the machine themselves. This has made available a large amount of data, detectable in real time, concerning the operation of such sensors and/or feeding devices.

The data acquired in digital format have the advantage of being appropriately sorted and reprocessed with computerized systems in order to provide a series of useful indications very rapidly.

In a textile machine of known type, such data are conveyed towards an electronic control unit connected to the sensors and/or devices for feeding textile yarns installed in the machine itself. Through appropriate management software of the machine associated with such a control unit and configured to reprocess the data provided by the sensors and/or the feeding devices, an operator can know the operating state of each of the devices which populate the machine and can enter or select various operating modes of such sensors and/or feeding devices by interacting with a display and a keyboard connected to the electronic control unit.

Nowadays, in the perspective of optimizing time and costs connected to the operative management of multiple textile machines present in a textile factory, the need is increasingly more felt to be able to access the data related to the job carried out by the textile machines also remotely, i.e. without the operator needing to go physically near each one in order to interact with the respective electronic control units.

For this purpose, a known solution is described in DE102006025747 A1, which relates to a system for controlling a textile production process which includes the use of a portable electronic device configured to establish a remote communication of the wireless type with a processing unit connected to the textile machine.

However, such a document does not provide suggestions concerning the possibility of making the number and type of sensors and/or feeding devices which populate a textile machine or multiple textile machines in a factory rapidly available to an operator. Furthermore, the solution described in such a document is silent regarding the possibility of carrying out selective update operations of operating data and parameters of the sensors and/or feeding devices of the textile machine.

SUMMARY OF THE INVENTION

It is the object of the present invention to devise and provide a method for detecting and remotely managing sensors and/or devices for feeding textile and/or metallic yarns installed on one or more textile machines which allows to overcome at least partially the drawbacks described above.

BRIEF DESCRIPTION OF THE DRAWINGS

Further features and advantages of the method and system according to the invention will become apparent from the following description which illustrates preferred embodiments, given by way of indicative, non-limiting examples, with reference to the accompanying drawings, in which.

Similar or equivalent elements in the aforesaid figures are indicated by means of the same reference numerals.

DETAILED DESCRIPTION OF THE PREFERRED EMBODIMENTS

Figure 1:
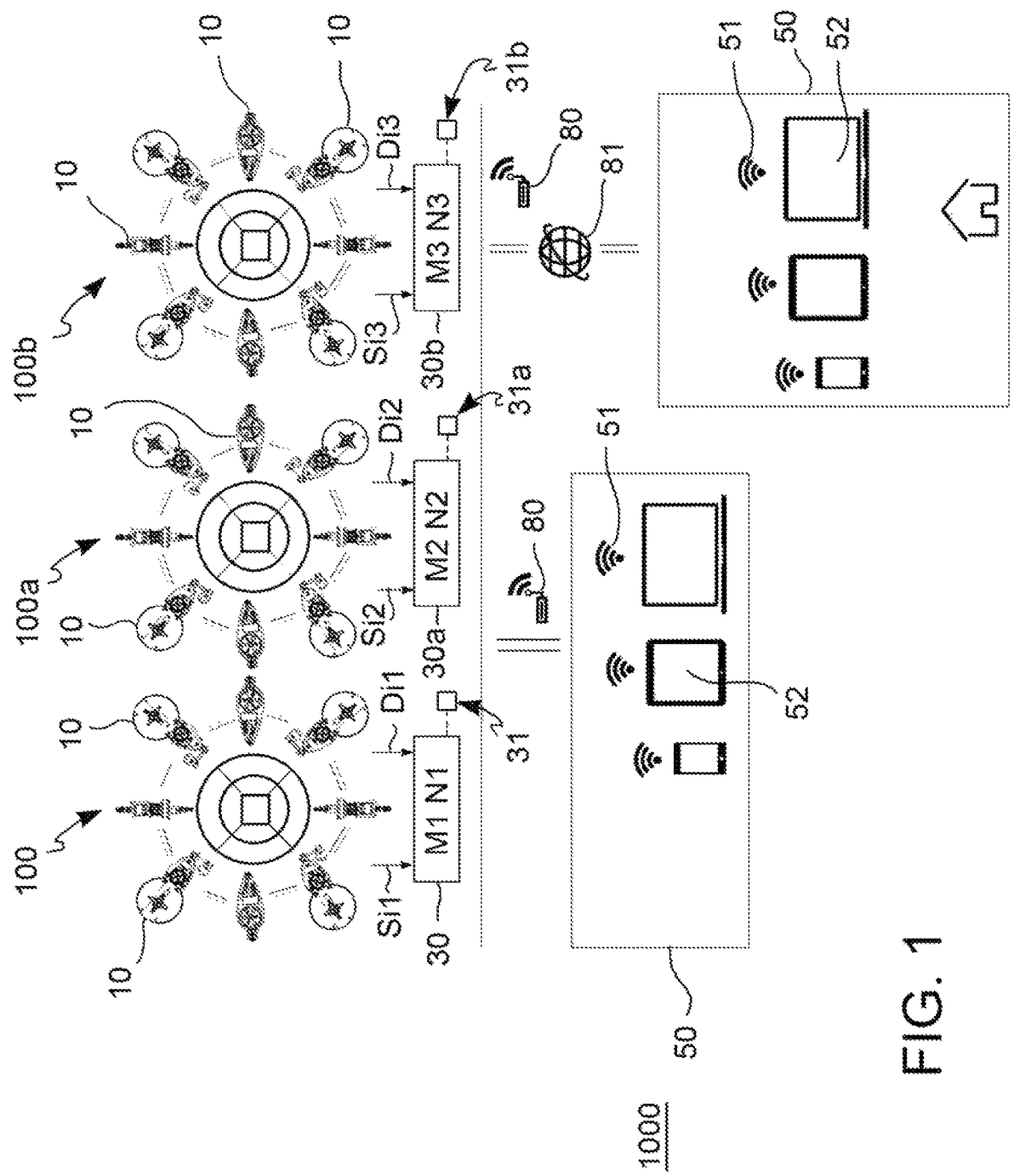
FIG. 1 diagrammatically shows a system which implements the method for detecting and remotely managing sensors and/or devices for feeding textile and/or metallic yarns installed on one or more textile machines according to the invention.

With reference to FIG. 1, a system for detecting and remotely managing sensors and/or devices for feeding textile and/or metallic yarns installed on one or more textile machines 100, 100a, 100b arranged in a textile factory is indicated as a whole by reference numeral 1000.

Hereafter, the system for detecting and remotely managing sensors and/or devices for feeding textile and/or metallic yarns installed on one or more textile machines 100, 100a, 100b will be indicated as system for detecting and managing sensors or more simply system.

With reference to the example in FIG. 1, it is presumed that three textile machines, indicated with reference numerals 100, 100a, 100b, respectively, are arranged in the textile factory. Furthermore, eight sensors and/or devices for feeding textile and/or metallic yarns are installed on each textile machines of known type, each indicated by reference numeral 10. For example, the yarn feeding devices of each machine may be mutually the same or different and comprise constant tension yarn feeders, constant speed yarn feeders. Furthermore, the sensors are configured to control at least one feature of each fed yarn, such as its tension, speed, diameter, quality, color and the like.

Each of such textile machines 100, 100a, 100b comprises an electronic control unit 30, 30a, 30b electrically connected to the aforesaid sensors and/or feeding devices 10 to receive identifiers Si1, Si2, Si3 (with i=1, . . . , 8), each associated with a sensor and/or feeding device 10 of the respective machine. Furthermore, the electronic control unit 30, 30a, 30b is configured to receive data and operating parameters Di1, Di2, Di3 (with i=1, . . . , 8) representative of a current or real operating state of the sensors and/or feeding devices 10 installed on the machine itself.

Such data and parameters Di1, Di2, Di3 of the sensors and/or feeding devices 10 comprise: software version; hardware version; working tension; amount of thread absorbed (LFA); work speed; state of the mechanical components and respective state parameters, such as temperature and mechanical calibration.

For example, the electronic control unit 30, 30a, 30b, referred to as a Power Feeder Unit or PFU by those skilled in the art, comprises a microprocessor unit provided with a respective memory housed on an electronic printed circuit board (PCB).

Again with reference to 1, the electronic control unit 30, 30a, 30b is configured to store first identifiers M1, M2, M3 with which of which a textile machine is associated. Such first identifiers M1, M2, M3 are represented by the type of textile machines present in the factory. Furthermore, the electronic control unit 30, 30a, 30b is configured to store first data and operating parameters N1, N2, N3, representative of a current or real operating state of the aforesaid one or more textile machines 100, 100a, 100b.

Each textile machine 100, 100a, 100b comprises first communication means 31, 31a, 31b operatively associated with the electronic control unit 30, 30a, 30b.

Figure 2:
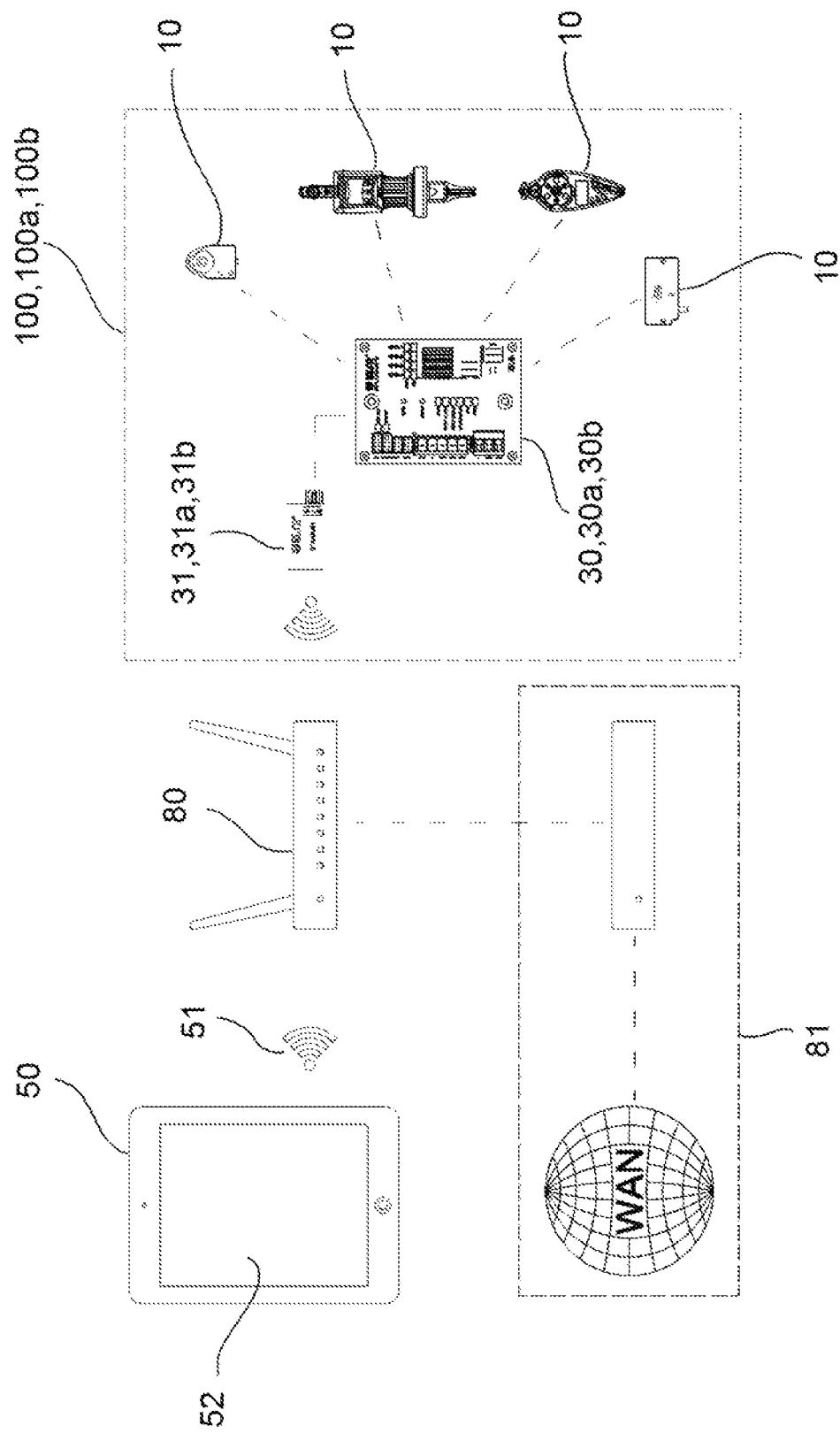
FIG. 2 shows a first example of connection between an electronic control unit of a textile machine of the system in FIG. 1 and a Wi-Fi access point.

With reference to FIG. 2, in a first embodiment, such first communication means are wireless communication means 31, 31a, 31b and comprise an electronic wireless communication board configured to be removably connected to the electronic control unit 30, 30a, 30b to establish a Wi-Fi communication with a Wi-Fi Access Point 80 provided in the textile factory.

In second embodiment, the first wireless communication means 31, 31a, 31b comprise a wireless electronic communication component which is connected to the electronic control unit 30, 30a, 30b. In particular, such an electronic component is fixed to the printed circuit broad which constitutes the electronic control unit 30, 30a, 30b to establish a Wi-Fi type communication with the Wi-Fi Access Point 80.

Figure 3:
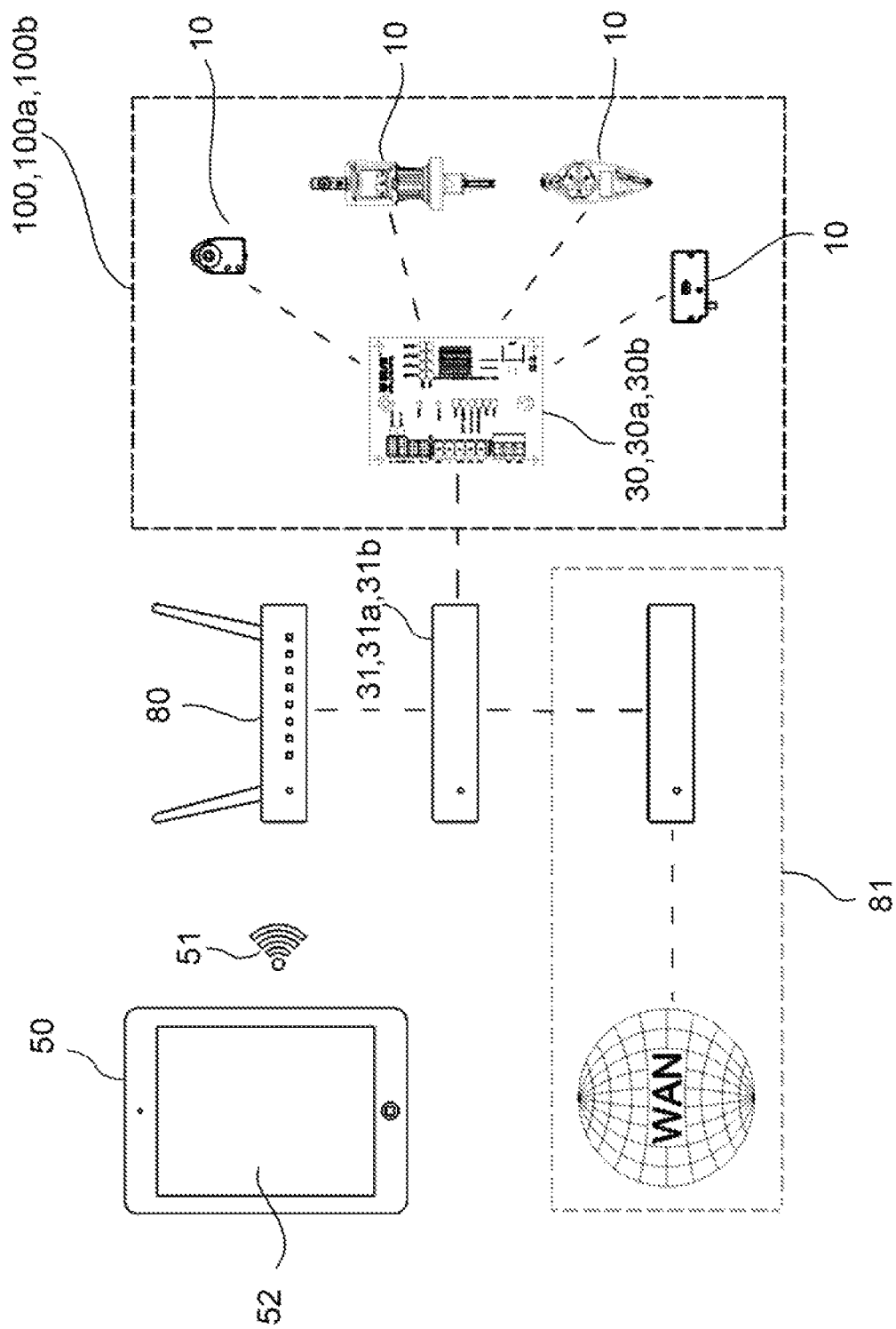
FIG. 3 shows a second example of connection between an electronic control unit of a textile machine of the system in FIG. 1 and a Wi-Fi access point.

A different embodiment, shown in FIG. 3, the first communication means 31, 31a, 31b comprise a physical connection, e.g. of the Ethernet type, between the electronic control unit 30, 30a, 30b and the aforesaid Wi-Fi Access Point 80.

It is worth noting that each textile machine 100, 100a, 100b can work as Wi-Fi client and/or using the Ethernet connection. In particular, the Wi-Fi Access Point 80 is configured to generate an IP address dedicated to each textile machine 100, 100a, 100b, which can be combined with an identification label of the name or number of the machine with which the electronic control unit is associated. In other words, by means of the aforesaid IP address, it is possible to access the information contained in the electronic control unit 30, 30a, 30b of each machine, via Wi-Fi or through the Ethernet connection, as explained below.

The system 1000 of the invention further comprises a portable electronic device 50 provided with second wireless communication means 51 and with display interface means 52. Such a portable electronic device 50 is configured to establish a wireless communication with the electronic control unit 30, 30a, 30b of the one or more textile machines 100, 100a, 100b.

In practice, the portable electronic device 50 is, for example, a smartphone, a tablet, a laptop or a smart-watch or similar device.

Each of such devices is equipped with the aforesaid second wireless communication means 51, in particular a Wi-Fi communication board. Thereby, as shown in the figures, the portable electronic device 50 is configured to access the Wi-Fi local area network of the textile factory through the Wi-Fi Access Point 80 present in the factory itself and to establish a communication with the electronic control unit 30, 30a, 30b of one or more textile machines 100, 100a, 100b connected to the network itself through such an Access Point.

In other words, the possibility of connecting the electronic control unit 30, 30a, 30b to the corporate Wi-Fi network through the univocal IP address for each textile machine allows any operator in the factory, provided with the portable electronic device 50, to interact with the machine and thus with the sensors and/or feeding devices which populate it.

The display interface means 52 of the portable electronic device 50 comprise, in particular, a touchscreen display operating by data input/output interface and for displaying information.

It is worth noting that the portable electronic device 50 is of the conventional type will not be described in greater detail.

With reference to the examples in FIGS. 2 and 3, the Wi-Fi Access Point 80 of the factory is connected to a WAN (Wide Area Network) 81 to connect the electronic control unit 30, 30a, 30b of each textile machine 100, 100a, 100b to the Internet.

In this case, the portable electronic device 50 is configured to establish a wireless remote protected communication with the electronic control unit 30, 30a, 30b of the one or more textile machines 100, 100a, 100b through the second wireless communication means 52 and the Internet network.

It is worth noting that such a communication is a remote communication because the Wi-Fi network of the textile factory may be accessed through a portable electronic device 50 located outside the plant, i.e. located at even several tens or hundreds of kilometers from the plant. Furthermore, such a remote communication may also be a protected communication (e.g. by using a password) which is based, for example, on the use of a Virtual Private Network—VPN or the like according to techniques known to those skilled in the art in the telecommunications field.

With reference to the aforesaid FIGS. 1-3, 4A-4B and 5, the operative steps of the method for detecting and remotely managing sensors and/or devices for feeding textile and/or metallic yarns 10 installed on one or more textile machines 100, 100a, 100b implemented by means of the system 1000 are described below in greater detail.

It is worth noting that the portable electronic device 50, for example a tablet 50, is provided to load the codes of an application program which implements the method of the present invention in a respective memory and to run it.

In a more general exemplary embodiment, the method comprises a first step of enabling a wireless communication between the electronic control unit of the one or more textile machines 100, 100a, 100b and the portable electronic device 50 described above.

The method then comprises a step of transmitting, by the electronic control unit 30, 30a, 30b, the identifiers Si1, Si2, Si3 of the sensors and/or feeding devices installed on the one or more textile machines 100, 100a, 100b to the portable electronic device 50.

Afterwards, the step of processing the identifiers Si1, Si2, Si3 is advantageously included to generate one or more menus with selectable entries 60, 60a, 60b, each associated with one of the one or more textile machines, by the portable electronic device 50. Each of such menus with selectable entries, shown for example by means of the graphic interfaces in FIGS. 4A-4B associated with the application program, represents the number and type of the sensors and/or feeding devices 10 installed on the one or more textile machines 100, 100a, 100b.

The method further comprises a step of displaying the aforesaid menus with selectable entries 60, 60a, 60b on the display interface means 52 of the portable electronic device 50.

Figure 4A:
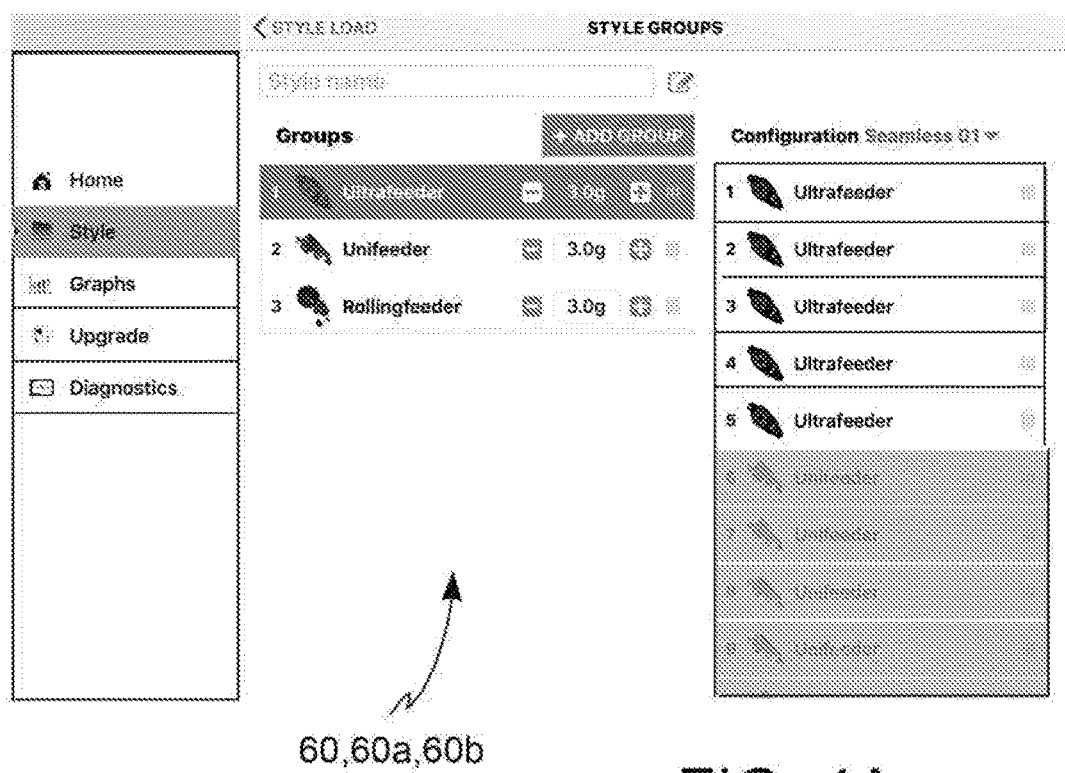
FIGS. 4A-4B show an example of graphical user interface or GUI of an application program according to the method of the invention which can be viewed on a display of a portable electronic device for detecting and remotely managing sensors and/or devices for feeding textile and/or metallic yarns installed on a textile machine.
Figure 4B:
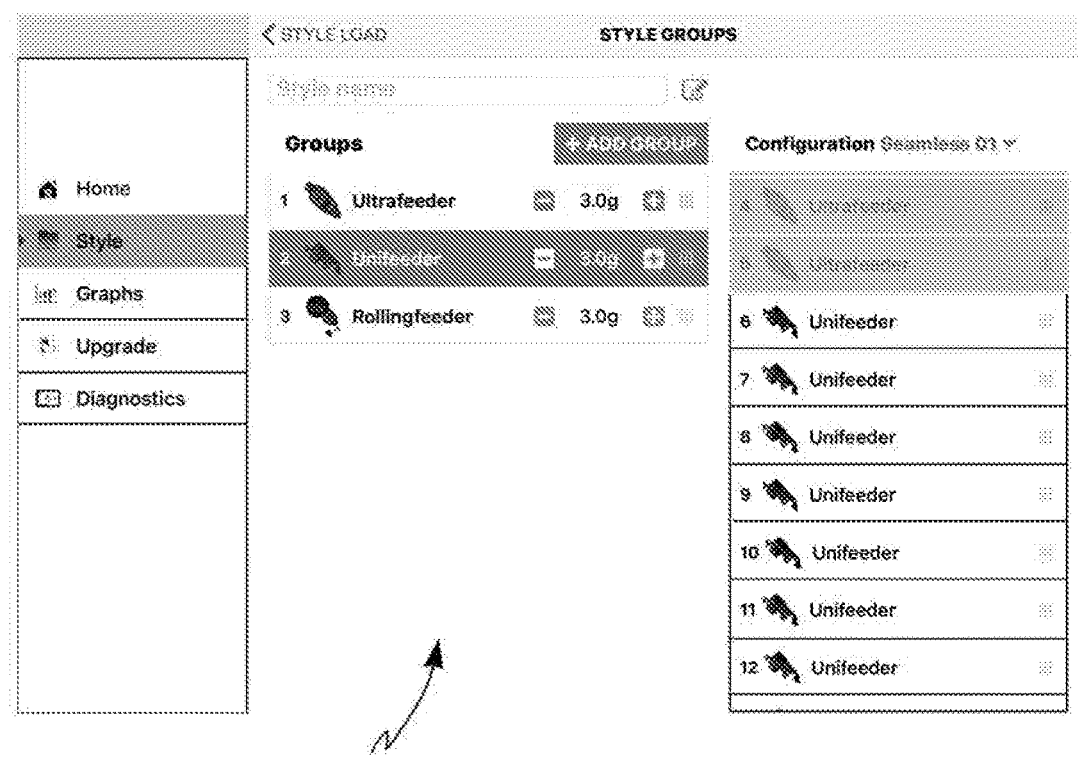

In particular, the graphic interfaces of the application program shown in FIGS. 4A-4B show that one of the textile machines present in the factory (the same also applies to the others) comprises three different types of yarn feeding devices, referred to as Ultrafeeder, Unifeeder and Rollingfeeder, respectively. FIG. 4A further shows that the machine (referred to as Seamless 01) is populated by five Ultrafeeder type feeding devices. FIG. 4B shows that the same machine is populated by seven Unifeeder type feeding devices.

In other words, the method of the invention makes a complete mapping of the sensors and/or feeding devices 10 which populate one or more textile machines inside the factory available to an operator.

In a particular embodiment, the method of the invention further comprises the steps of:
transmitting, by the electronic control unit 30, 30a, 30b, the data and the operating parameters Di1, Di2, Di3 representative of a current or real operating state of the sensors and/or feeding devices installed on the one or more textile machines 100, 100a, 100b to the portable electronic device 50;
selecting the menu with selectable entries 60 associated with one 100 of one or more textile machines;
classifying the sensors and/or feeding devices installed on the textile machine 100 selected from one or more groups of mutually homogeneous sensors and/or feeding devices.

In particular, such a classification or distribution is carried out by comparing the values of one or more of the data and operating parameters Di1, Di2, Di3 received by the portable electronic device 50 with reference values.

For example, a homogeneous group of sensors (or feeding devices) may comprise sensors (or feeding devices) all of the same type having a same operating parameter mutually in common.

In particular, the aforesaid classification step is carried out periodically as the current or real data and operating parameters Di1, Di2, Di3 received by the portable electronic device 50 vary in order to modify the number of groups of sensors and/or feeding devices 10 of the selected textile machine 100, and the number and type of sensors and/or feeding devices 10 of each group.

In a further embodiment, the method of the invention includes a step of transmitting, by the electronic control unit 30, 30a, 30b, first identifiers M1, M2, M3, each of which is associated with a textile machine, to the portable electronic device 50.

Additional, a step of transmitting first data and operating parameters N1, N2, N3, representative of a current or real operating state of the aforesaid one or more textile machines 100, 100a, 100b, to the portable electronic device 50 is included.

The method comprises a step of processing, by the portable electronic device 5, such first identifiers M1, M2, M3 to generate a main menu 70 with selectable entries associated with the one or more textile machines. Such a main menu 70, shown for example by means of the graphic interface of FIG. 5 of the application program, is representative of the number and type of the textile machines 100, 100a, 100b present in a factory.

Furthermore, the method includes the step of displaying such a main menu with selectable entries 70 on the display interface means 52 of the portable electronic device 50.

Figure 5:
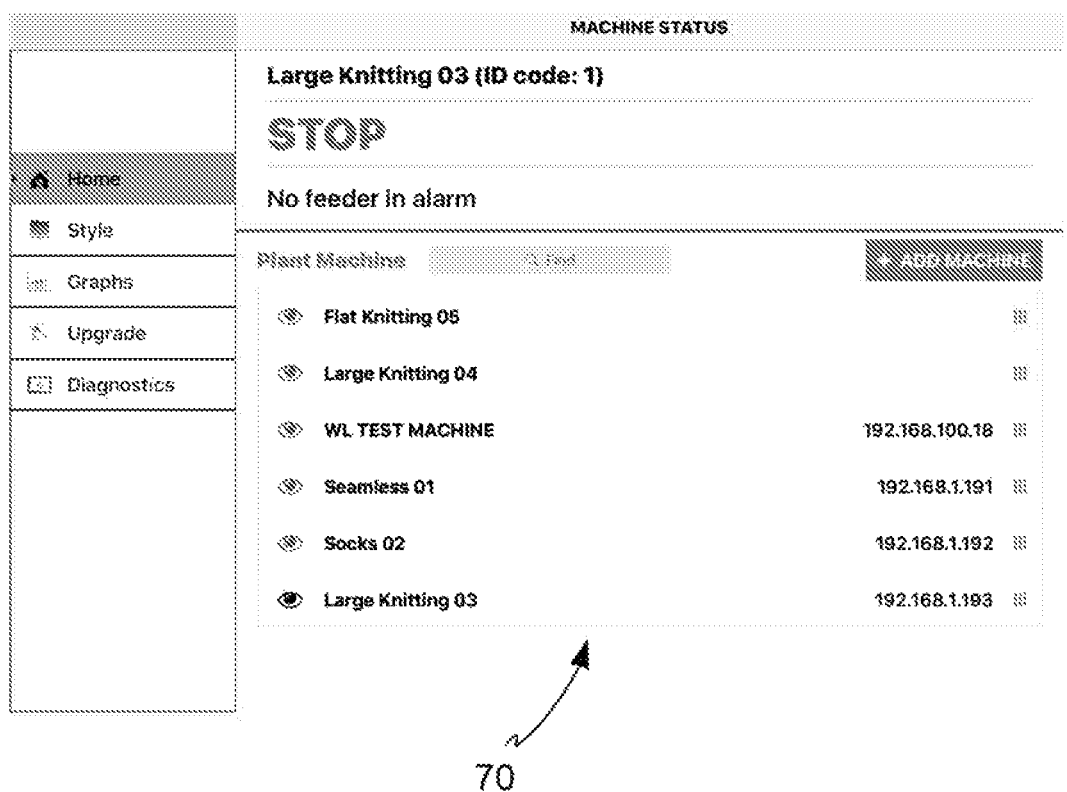
FIG. 5 shows an example of graphical user interface or GUI of an application program according to the method of the invention which can be viewed on a display of a portable electronic device for detecting and remotely managing textile machines present in a textile factory.

For example, the graphic interface of the application program in FIG. 5 shows that various types of textile machines, referred to as Flat Knitting 05, Large Knitting 04, WL TEST Machine, Seamless 01, Socks 02, Large Knitting 03, can be identified and selected in the factory. FIG. 5, in particular, shows that a first identifier or ID code equal to 1 is associated with the Large Knitting machine 03.

With reference to the sensors and/or feeding devices 10 of a textile machine 100, 100a, 100b, in an advantageous example of embodiment, the method of the invention further includes the steps of:
selecting one of the aforesaid one or more groups of mutually homogeneous sensors and/or feeding devices;
comparing each of the current or real data and operating parameters Di1, Di2, Di3 of the sensors and/or feeding devices 10 of the selected group with desired data and parameters;
updating, by the portable electronic device 50, at least one of the current or real data and operating parameters of one or more sensors and/or feeding devices 10 of the selected group, replacing it with the desired datum and parameter following the detection of a discrepancy between the at least one current or real datum and operating parameter Di1, Di2, Di3 and the corresponding desired datum and parameter.

In a particular example, such an updating step is carried out automatically by the portable electronic device 50 following the detection of a discrepancy between the at least one current or real operating datum and operating parameter Di1, Di2, Di3 and the corresponding desired datum and parameter, i.e. without requiring an action by an operator on the menu with selectable entries 60, 60a, 60b displayed by the portable electronic device 50.

It is worth noting, in particular, that the updatable real or actual data and parameters Di1, Di2, Di3 of the sensors and/or feeding devices 10 are selected in the group consisting of: software version; hardware version; working tension; amount of thread absorbed (LFA); work speed; state of the mechanical components and respective state parameters, such as temperature and mechanical calibration.

For example, the application program, stored and running on the portable electronic device 50, is configured to receive the software versions periodically for updating one or more sensors and/or feeding devices of a machine. Such update versions are supplied to the portable device 50 in push mode by means of email messages, text messages, or via Bluetooth, or can be downloaded via a connection to a storage cloud. Once the update software package has been downloaded, the operator may thus choose whether to update a single sensor and/or feeding device of a group, multiple devices of such groups or the entire group.

With reference to the textile machines 100, 100a, 100b present in a same factory, in an advantageous example of embodiment, the method further comprising the steps of:
- selecting one of such textile machines 100 from the main menu with selectable entries 70, e.g. the Large Knitting machine 03 in FIG. 5;
- comparing the first current or real data and operating parameters N1 of the selected textile machine 100 with first desired data and parameters;
- updating, by the portable electronic device 50, at least one of the aforesaid first current or real data and operating parameters N1 of the selected machine 100 by replacing them with the first desired data and parameters following the detection of a discrepancy between the at least one of the current or real data and operating parameters of the machine and the corresponding first desired datum and parameter.

It is worth noting, in particular, that the first current or real data and parameters N1, N2, N3 of the updatable machines are selected in the group consisting of: hardware version; efficiency of production; state of advancement of production; stop state of the machine; work state of the machine.

The method for detecting and remotely managing sensors and/or devices for feeding textile and/or metallic yarns installed on one or more textile machines according to the present invention and the respective system 1000 have many advantages.

As mentioned, the method makes a complete mapping of the sensors and/or feeding devices which populate one textile machine or more textile machines inside a factory available to an operator provided with a portable electronic device 50.

Furthermore, starting from the aforesaid mapping, the suggested method allows to carry out selective updating operations of data and operative parameters of the sensors and/or feeding devices of one or more textile machines, as well as the data and operating parameters of each machine.

The method allows to carry out diagnostic and proactive actions in real time for one and/or more sensors and/or feeding devices and/or working groups which populate the textile machine, such as: updating the software version; updating the hardware version; setting up the optimal working tension; setting up specific software parameters according to the type of job-article in progress; replacing one or more sensors and/or feeding devices with one/or more of a newer generation for increasing the process efficiency of the job-article.

Furthermore, with the method of the invention, it is possible to detect and update in a "local" and/or "remote" manner one and/or more sensors and/or feeding devices by means of a connection which always ensures a high level data transmission security.

A further advantage of the invention is to reduce considerably the production downtimes of one or more textile machines, thus being able to intervene in real time on or more sensors and/or feeding devices without needing to avail of technical assistance operations. Consequently, with the suggested invention, the costs connected to the operative management of multiple textile machine present in a textile factory are also reduced.

Those skilled in art may make changes and adaptations to the embodiments of the method and system of the invention or can replace elements with others which are functionally equivalent to satisfy contingent needs without departing from the scope of the appended claims. Each of the features described as belonging to a possible embodiment can be obtained irrespective of the other described embodiments.

The invention claimed is:

1. A method for detecting and remotely managing sensors and/or feeding devices for feeding textile and/or metallic yarns installed on one or more textile machines, wherein each textile machine comprises:
   an electronic control unit electrically connected to said sensors and/or feeding devices for receiving identifiers each associated with one of said sensors and/or feeding devices and data and operating parameters representative of a current or real operating state of said sensors and/or feeding devices installed;
   first communication means operatively associated with said electronic control unit; the method comprising the steps of:
   enabling wireless communication between the electronic control unit of the one or more textile machines and a portable electronic device provided with second wireless communication means and with a display interface;
   the electronic control unit transmitting said identifiers of the sensors and/or feeding devices installed on the one or more textile machines to the portable electronic device;
   processing said identifiers to generate, by the portable electronic device, one or more menus with selectable entries each associated with one of said one or more textile machines, each of said menus with selectable entries being representative of the number and type of sensors and/or feeding devices installed on the one or more textile machines;
   displaying said menus with selectable entries on said display interface of the portable electronic device.

2. Method for detecting and remotely managing sensors and/or devices for feeding textile and/or metallic yarns installed on one or more textile machines according to claim 1, further comprising the steps of:
   the electronic control unit transmitting the data and the operating parameters representative of a current or real operating state of the sensors and/or feeding devices installed on the one or more textile machines to the portable electronic device;
   selecting the menu with selectable entries associated with one of said one or more textile machines;
   classifying the sensors and/or feeding devices installed on the selected textile machine in one or more groups of sensors and/or feeding devices that are homogeneous to each other based on a comparison of the values of one or more of said data and operating parameters received by the portable electronic device with reference values.

3. Method for detecting and remotely managing sensors and/or devices for feeding textile and/or metallic yarns installed on one or more textile machines according to claim 2, wherein said step of classifying is carried out periodically as the current or real data and operating parameters received by the portable electronic device vary to modify a quantity of groups of sensors and/or feeding devices of the selected textile machine, and a quantity and type of sensors and/or feeding devices of each group.

4. Method for detecting and remotely managing sensors and/or devices for feeding textile and/or metallic yarns installed on one or more textile machines according to claim 2, further comprising the steps of:
   selecting one of said one or more groups of sensors and/or feeding devices that are homogeneous with one another;

comparing each of the current or real data and operating parameters of the sensors and/or feeding devices of the selected group with desired data and parameters;

the portable electronic device updating at least one of said current or real data and operating parameters of one or more sensors and/or feeding devices of the selected group, replacing it with the desired datum and parameter following the detection of a discrepancy between said at least one current or real datum and operating parameter and the corresponding desired datum and parameter.

5. Method for detecting and remotely managing sensors and/or devices for feeding textile and/or metallic yarns installed on one or more textile machines according to claim 4, wherein said updating step is carried out by the portable electronic device automatically following detection of a discrepancy between said at least one current or real datum and operating parameter and corresponding desired datum and parameter, without requiring action of an operator on the menu with selectable entries displayed by the portable electronic device.

6. Method for detecting and remotely managing sensors and/or devices for feeding textile and/or metallic yarns installed on one or more textile machines according to claim 4, wherein said updatable current or real data and operating parameters are selected from the group consisting of: software version; hardware version; working tension; amount of thread absorbed (LFA); work speed; state of mechanical components and respective state parameters including temperature and mechanical calibration.

7. Method for detecting and remotely managing sensors and/or devices for feeding textile and/or metallic yarns installed on one or more textile machines according to claim 1, further comprising the steps of:

the electronic control unit transmitting to the portable electronic device first identifiers each associated with a machine of said one or more textile machines and representative of the type of said machine, and first data and operating parameters representative of a current or real operating state of said one or more textile machines;

processing said first identifiers to generate, by the portable electronic device, a main menu with selectable entries associated with said one or more textile machines, the main menu being representative of the number and type of the textile machines present in a factory;

displaying said main menu with selectable entries on said display interface of the portable electronic device.

8. Method for detecting and remotely managing sensors and/or devices for feeding textile and/or metallic yarns installed on one or more textile machines according to claim 7, further comprising the steps of:

selecting one of said textile machines from said main menu with selectable entries;

comparing each of the first current or real data and operating parameters of said selected textile machine with first desired data and parameters;

the portable electronic device updating at least one of said first current or real data and operating parameters of the selected machine by replacing the at least one of said first current or real data and operating parameters of the selected machine with said first desired data and parameters following detection of a discrepancy between the at least one of the current or real data and operating parameters of the machine and a corresponding first desired datum and parameter.

9. Method for detecting and remotely managing sensors and/or devices for feeding textile and/or metallic yarns installed on one or more textile machines according to claim 8, wherein said first updatable current or real data and operating parameters are selected from the group consisting of: hardware version; efficiency of production; state of advancement of production; stop state of the machine; work state of the machine.

10. A system for detecting and remotely managing sensors and/or devices for feeding textile and/or metallic yarns installed on one or more textile machines, wherein each textile machine comprises:

an electronic control unit electrically connected to said sensors and/or feeding devices for receiving identifiers each associated with a sensor and/or feeding device and data and operating parameters representative of a current or real operating state of the sensors and/or feeding devices installed;

first communication means operatively associated with said electronic control unit;

the system comprising:

a portable electronic device provided with second wireless communication means and with said display interface, said device being configured to establish a wireless communication with the electronic control unit of the one or more textile machines to carry out the steps of the method according to claim 1.

11. System according to claim 10, wherein said first communication means are wireless communication means and comprise an electronic wireless communication board configured to be removably connected to the electronic control unit to establish Wi-Fi communication with a Wi-Fi Access Point.

12. System according to claim 10, wherein said first communication means are wireless communication means and comprise a wireless electronic communication component connected to the electronic control unit to establish Wi-Fi communication with a Wi-Fi Access Point.

13. System according to claim 12, wherein the Wi-Fi Access Point is connected to a WAN geographical communication network to connect the electronic control unit of each textile machine to the Internet, the portable electronic device being configured to establish a wireless remote protected communication with the electronic control unit of the one or more textile machines through the second wireless communication means and said Internet network.

14. System according to claim 10, wherein said first communication means comprise a physical Ethernet connection of the electronic control unit with a Wi-Fi Access Point.

15. System according to claim 10, wherein the portable electronic device is in the form of a smartphone, a tablet, a laptop or a smart-watch.

16. System according to claim 10, wherein the display interface of the portable electronic device comprises a touchscreen display operating by data input/output interface.

17. A non-transitive computer program to be loaded into a memory of a portable electronic device configured to establish wireless communication with an electronic control unit of one or more textile machines to carry out the steps of the method for detecting and remotely managing sensors and/or devices for feeding textile and/or metallic yarns installed on said machines according to claim 1.

* * * * *